US011710596B2

(12) United States Patent
Nishimura

(10) Patent No.: US 11,710,596 B2
(45) Date of Patent: Jul. 25, 2023

(54) COIL DEVICE

(71) Applicant: IHI CORPORATION, Tokyo (JP)

(72) Inventor: Kenji Nishimura, Tokyo (JP)

(73) Assignee: IHI CORPORATION, Tokyo (JP)

( * ) Notice: Subject to any disclaimer, the term of this patent is extended or adjusted under 35 U.S.C. 154(b) by 1251 days.

(21) Appl. No.: 16/312,858

(22) PCT Filed: Sep. 21, 2016

(86) PCT No.: PCT/JP2016/077852
§ 371 (c)(1),
(2) Date: Dec. 21, 2018

(87) PCT Pub. No.: WO2018/055698
PCT Pub. Date: Mar. 29, 2018

(65) Prior Publication Data
US 2019/0333693 A1 Oct. 31, 2019

(51) Int. Cl.
| H01F 27/06 | (2006.01) |
| H01F 27/28 | (2006.01) |
| H01F 38/14 | (2006.01) |
| H02J 50/10 | (2016.01) |

(52) U.S. Cl.
CPC .............. *H01F 38/14* (2013.01); *H01F 27/06* (2013.01); *H01F 27/2823* (2013.01); *H02J 50/10* (2016.02)

(58) Field of Classification Search
CPC .... H01F 27/2823; H01F 27/06; H01F 27/325; H01F 27/306

USPC ........................................................ 336/65
See application file for complete search history.

(56) References Cited

U.S. PATENT DOCUMENTS

| 4,637,563 A | 1/1987 | Arii et al. | |
| 6,380,834 B1 * | 4/2002 | Canzano ............ | H01F 27/2804 336/200 |
| 9,027,229 B2 * | 5/2015 | Thorslund .......... | H01F 27/2804 29/605 |
| 9,390,851 B2 * | 7/2016 | Suzuki .................... | H02J 50/12 |
| 11,170,922 B2 | 11/2021 | Nishimura | |
| 2013/0093032 A1 * | 4/2013 | Webb .................... | H01L 23/645 257/E29.323 |
| 2013/0278374 A1 * | 10/2013 | Thorslund ............... | H01F 27/29 336/200 |
| 2014/0176288 A1 * | 6/2014 | Jung .................... | H01F 41/046 336/207 |

(Continued)

FOREIGN PATENT DOCUMENTS

| CN | 86103570 A | 1/1987 |
| CN | 102982999 A | 3/2013 |

(Continued)

*Primary Examiner* — Mang Tin Bik Lian
*Assistant Examiner* — Joselito S. Baisa
(74) *Attorney, Agent, or Firm* — Volpe Koenig

(57) ABSTRACT

A coil device includes a conductive wire forming a coil, a coil base having a groove for accommodating the conductive wire, and a stopper being separate from the coil base and attached to the coil base to cover the conductive wire. The stopper includes a base portion attached to the coil base at a position adjacent the groove, and a distal end portion integrated with the base portion to cover the conductive wire. The base portion of the stopper is rotatable. Alternatively, the distal end portion of the stopper is deformable.

17 Claims, 9 Drawing Sheets

(56) References Cited

U.S. PATENT DOCUMENTS

| | | | |
|---|---|---|---|
| 2015/0101854 A1* | 4/2015 | Lee | H01F 41/046 |
| | | | 29/606 |
| 2015/0145342 A1* | 5/2015 | Chiyo | H01F 38/00 |
| | | | 336/170 |
| 2017/0288465 A1* | 10/2017 | Sugasawa | H02J 7/0042 |
| 2018/0141451 A1* | 5/2018 | Totsuka | H02J 50/70 |

FOREIGN PATENT DOCUMENTS

| | | | | |
|---|---|---|---|---|
| CN | 103634958 A | | 3/2014 | |
| CN | 203562800 U | | 4/2014 | |
| CN | 104105238 A | * | 10/2014 | |
| CN | 205921776 U | * | 2/2017 | |
| CN | 206993446 U | * | 2/2018 | |
| JP | 55-084765 A | | 6/1980 | |
| JP | 61-193394 A | | 8/1986 | |
| JP | 05-251167 A | | 9/1993 | |
| JP | 09-074040 A | | 3/1997 | |
| JP | 09-082465 A | | 3/1997 | |
| JP | 2008166476 A | * | 7/2008 | |
| JP | 2012-114058 A | | 6/2012 | |
| JP | 2014-239168 A | | 12/2014 | |
| JP | 2015-012066 A | | 1/2015 | |
| JP | 2015012066 A | * | 1/2015 | |
| JP | 2016076605 A | * | 5/2016 | |
| JP | 5956464 B2 | * | 7/2016 | H01F 27/2804 |
| JP | 6417713 B2 | * | 11/2018 | B60L 53/12 |
| JP | 6717127 B2 | * | 7/2020 | H01F 27/06 |

* cited by examiner

COIL DEVICE

TECHNICAL FIELD

The present disclosure relates to a coil device.

BACKGROUND ART

A wireless power transfer system includes a transmitting coil device and a receiving coil device and achieves wireless power transfer by utilizing, for example, electromagnetic induction or magnetic resonance between coils. For instance, in a coil device disclosed in Patent Literature 1, a planarly wound wire is accommodated in a groove formed in one side of a bobbin. In such a coil device, if the wire is formed from a hard material, the wire may protrude from the groove and may not be accommodated in a desired position in the groove. To address such a problem, for example, in a coil device disclosed in Patent Literature 2, a wound conductive wire is accommodated in an area surrounded by a bottom plate and a side plate and fixed within that area by an adhesive resin. In addition to those described above, a coil device disclosed in Patent Literature 3 is also known.

CITATION LIST

Patent Literature

Patent Literature 1: Japanese Unexamined Patent Publication No. 2015-12066
Patent Literature 2: Japanese Unexamined Patent Publication No. 2014-239168
Patent Literature 3: Japanese Unexamined Patent Publication No. 2012-114058

SUMMARY OF INVENTION

Technical Problem

In coil devices such as those described above, it is required that the conductive wires are securely accommodated in desired positions in the grooves and that they are easily attached to the coil devices. The present disclosure describes a coil device which can securely accommodate a conductive wire in a desired position in a groove and to which the conductive wire can be easily attached.

Solution to Problem

A coil device according to an embodiment of the present disclosure includes a conductive wire forming a coil, a coil base having a groove for accommodating the conductive wire, and a stopper being separate from the coil base and attached to the coil base to cover the conductive wire, wherein the stopper includes a base portion attached to the coil base at a position adjacent the groove, and a distal end portion integrated with the base portion to cover the conductive wire, and wherein the base portion of the stopper is rotatable or the distal end portion of the stopper is deformable.

Effects of Invention

According to an embodiment of the present disclosure, the conductive wire can be securely accommodated in a desired position in the groove and can be easily attached to the coil base.

DESCRIPTION OF EMBODIMENTS

Figure 1:
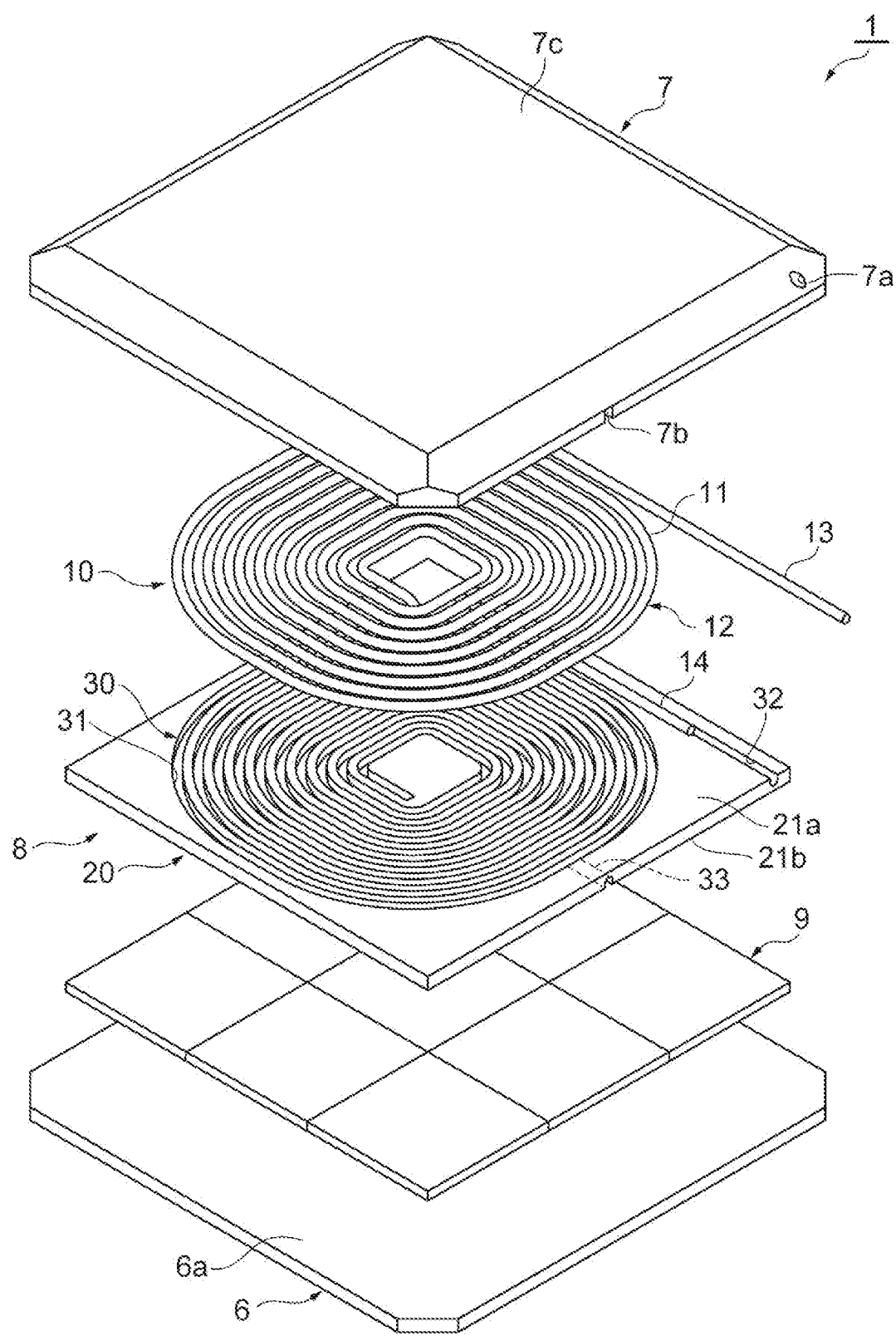
FIG. 1 is an exploded perspective view illustrating a coil device according to a first embodiment of the present disclosure.

A coil device according to an embodiment of the present disclosure includes a conductive wire forming a coil, a coil base having a groove for accommodating the conductive wire, and a stopper being separate from the coil base and attached to the coil base to cover the conductive wire, wherein the stopper includes a base portion attached to the coil base at a position adjacent the groove, and a distal end portion integrated with the base portion to cover the conductive wire, and wherein the base portion of the stopper is rotatable or the distal end portion of the stopper is deformable.

The stopper is attached to the coil base of the coil device. The distal end portion of the stopper covers the conductive wire. The stopper prevents the conductive wire accommodated in the groove from being removed from the groove. Thus, the conductive wire can be securely accommodated in a desired position in the groove. Rotating the base portion of the stopper or deforming the distal end portion of the stopper enables the distal end portion to be separated from where the conductive wire is accommodated in the groove. The conductive wire can thus be placed into the groove. Returning the stopper by rotating the base portion or returning the deformed distal end portion to its original position causes the distal end portion to cover the conductive wire. Consequently, the conductive wire can be easily attached to the coil base.

In some embodiments, the coil base has an accommodating portion continuous with the groove and the base portion is accommodated in the accommodating portion. Having the base portion accommodated in the accommodating portion allows a portion of the stopper to be contained inside the coil base. This enables the coil base with the stopper to be compact. This also facilitates covering of the conductive wire by the distal end portion, since the base portion is close to the groove.

In some embodiments, the stopper is entirely accommodated in the accommodating portion and the groove and does not protrude from a surface of the coil base. In this case, since the stopper does not protrude from the surface of the coil base, the conductive wire is less likely to interfere with other components. The coil base holding the conductive wire can be easily assembled to the other components. This achieves a generally compact coil device.

In some embodiments, the base portion of the stopper is rotatable about an axis, and the distal end portion of the stopper is movable to a first position for covering the conductive wire and a second position away from the groove. When the stopper is in the first position, the stopper prevents the conductive wire from being removed from the groove. When the stopper is in the second position, the conductive wire can be easily placed into the groove.

In some embodiments, the base portion of the stopper includes a projection engageable in a recess formed in a wall surface of the coil base. In this case, the engagement of the projection in the recess restricts the rotation of the stopper. This prevents the stopper from moving inadvertently and facilitates maintaining the position of the stopper.

In some embodiments, the coil base includes a projection engageable in a recess formed in the base portion of the stopper. In this case, the engagement of the projection in the recess restricts the rotation of the stopper. This facilitates maintaining the position of the stopper.

In some embodiments, the stopper includes the base portion having a cylindrical shape and rotatable about the axis and a plurality of teeth formed on a circumference of the base portion, and one of the teeth covers the conductive wire as the distal end portion. When placing the conductive wire into the groove, the conductive wire may abut against the teeth of the stopper, but the rotation of the base portion can reduce the load on the conductive wire. The conductive wire can be easily placed into the groove. After the conductive wire is accommodated, one of the teeth covers the conductive wire so that the conductive wire does not tend to be removed from the groove.

In some embodiments, the stopper is formed from an elastic material and the distal end portion of the stopper is deformable. The deformable stopper facilitates placing of the conductive wire into the groove. The stopper formed from an elastic material also enables the distal end portion to hold down the conductive wire.

A coil device 1 according to a first embodiment will be described with reference to FIG. 1. The coil device 1 can be applied, for example, to a wireless power transfer system. The coil device 1 can be applied to a power transmitter or a power receiver of the wireless power transfer system. The power transmitter is installed, for example, in a parking lot. The power receiver is mounted, for example, on an electric vehicle. The wireless power transfer system is configured to feed power to the electric vehicle utilizing, for example, a magnetic resonance method or an electromagnetic induction method.

The coil device 1 has, for example, a flat rectangular parallelepiped shape or a frustum shape. The coil device 1 includes a tabular base plate 6, a flat rectangular parallelepiped-shaped cover 7, a coil 10, a coil base 8, and a ferrite 9. An accommodating space between the base plate 6 and the cover 7 accommodates, in order from the base plate 6, the ferrite 9, the coil base 8, and the coil 10. For example, when the coil device 1 is installed in an electric vehicle, the base plate 6 is fixed to the body of the vehicle. The cover 7 faces the coil device of the power transmitter.

The base plate 6 ensures strength of the coil device 1 and blocks outflow of leakage flux. The base plate 6 is formed, for example, from a nonmagnetic electrically conductive material (such as aluminum).

The cover 7 protects the coil 10, the coil base 8, and the ferrite 9. The cover 7 is formed, for example, from a nonmagnetic insulating material (such as glass-fiber reinforced plastic (GFRP)).

The coil 10 is capable of generating an induced current. The coil 10 is formed by a conductive wire 11 that is wound in a substantially rectangular spiral within the same plane. The coil 10 is, for example, a circular type. The circular type is an aspect in which the conductive wire 11 is wound in a flat spiral. The coil 10 viewed in a direction of the winding axis can have any shape, including rectangular, circular, or oval. The conductive wire 11 may, for example, be a solid wire, a litz wire, or a bus bar which are made of copper or aluminum.

The coil 10 includes a coil body 12 that is wound in a substantially rectangular spiral, a drawn portion 13 that extends outside the accommodating space from an outermost peripheral edge of the coil body 12 through an opening 7a in the cover 7, and a drawn portion 14 that extends outside the accommodating space from an innermost peripheral edge of the coil body 12 through an opening 7b in the cover 7. The drawn portions 13, 14 extend in the same direction. It should be noted that the drawn portions 13, 14 may extend in different directions.

The conductive wire 11 may be a litz wire. A high-frequency current can flow through the conductive wire 11 of the coil device 1. In general, the higher the frequency of the current that flows through the conductive wire 11, the greater the skin effect in the conductive wire 11. As the skin effect increases, the resistance of the conductive wire 11 increases and heat loss may increase. The litz wire is capable of inhibiting the skin effect. The litz wire has a structure in which a plurality of conductor strands insulated from each other are twisted together.

The coil base 8 is positioned between the coil 10 and the base plate 6. The tabular coil base 8 holds the coil 10 on a first surface 21a out of the first surface 21a and an opposite second surface 21b. A detailed structure of the coil base 8 will be described later.

The ferrite 9 is a magnetic material. The ferrite 9 directs and concentrates magnetic lines of force generated by the coil 10. The tabular ferrite 9 is positioned between the coil base 8 and the base plate 6. The ferrite 9 is held sandwiched between the coil base 8 and the base plate 6. The shape and size of the ferrite 9 can be determined as appropriate. The ferrite 9 may have a shape substantially equal to the shape of the coil base 8 when viewed in plan view. The ferrite 9 may have a size substantially equal to the size of the coil base 8 when viewed in plan view. The ferrite 9 may be smaller than the coil base 8 or may be larger than the coil base 8.

The configuration of the coil base 8 will next be described with reference to FIGS. 2 and 3. The coil base 8 includes a rectangular tabular main body 20, and a groove 30 that is formed in the first surface 21a of the main body 20 and accommodates the conductive wire 11. The first surface 21a of the main body 20 faces a top surface 7c of the cover 7. The second surface 21b of the main body 20 faces a first surface 6a of the base plate 6.

The coil base 8 is made from a material having electrical insulation characteristics. The coil base 8 is formed, for example, from a hard resin material (such as polyphenylene sulfide resin). The coil base 8 is integrally molded. The coil base 8 has a predetermined thickness. The coil base 8 has a thickness that is greater than an outer diameter c of the conductive wire 11. The coil base 8 has a predetermined strength so as not to deform or break by disturbance (external force). The coil base 8 is capable of maintaining the shape of the coil 10.

When the first surface 21*a* is viewed in plan view, the groove 30 has a substantially rectangular spiral shape. The groove 30 includes a substantially rectangular spiral-shaped groove body 31 that accommodates the coil body 12, a first end 32 that accommodates the drawn portion 13, and a second end 33 that accommodates the drawn portion 14. The groove body 31 and the first end 32 are formed in the first surface 21*a* and the second end 33 is formed in the second surface 21*b*. The second end 33 communicates with the groove body 31 through a through hole 22. It should be noted that although the drawn portion 14 of the coil 10 is accommodated in the second end 33 in the rear side of the coil base 8, the present disclosure is not limited thereto. The drawn portion 14 of the coil 10 may be accommodated in a groove (slit) formed in the ferrite 9. In this case, the coil base 8 will be relatively thin and the distance between the conductive wire 11 and the ferrite 9 will be shorter.

The groove body 31 includes a plurality of linear grooves 34*a* that extend linearly, and a plurality of curved grooves 34*b* that are curved. The groove body 31 forms a spiral groove by having the linear grooves 34*a* and the curved grooves 34*b* continuing alternately along a winding direction in each turn.

The linear grooves 34*a* are arranged in parallel along four sides 23*a*, 23*b*, 23*c*, 23*d* that form an outer edge of the main body 20. The linear grooves 34*a* are arranged in parallel at regular intervals from a central part of the first surface 21*a* toward the sides 23*a*, 23*b*, 23*c*, 23*d*. The curved grooves 34*b* are arranged in parallel at regular intervals from the central part of the first surface 21*a* toward four corners 24*a*, 24*b*, 24*c*, 24*d* of the main body 20. The radius of curvatures of the curved grooves 34*b* decrease progressively toward the corners 24*a*, 24*b*, 24*c*, 24*d*.

Figure 4:
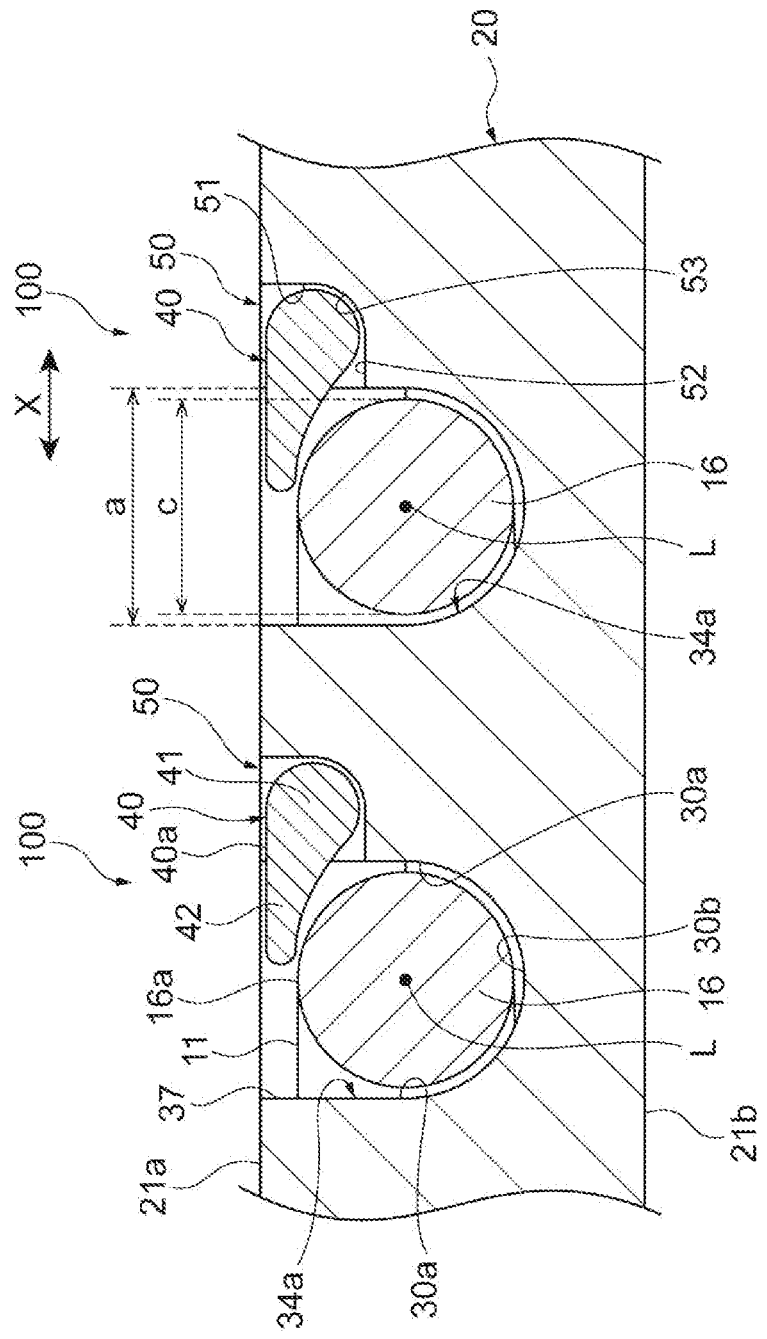
FIG. 4 is a partly enlarged view of FIG. 3 and a cross-sectional view illustrating holding structures of the coil.

The shape of the groove 30 will be described in detail. As shown in FIG. 4, the groove 30 accommodates the conductive wire 11. The groove 30 has a cross section perpendicular to an axis L of the conductive wire 11, the cross section having a U-shape opened toward the cover 7. The groove 30 is recessed from the first surface 21*a* and has a predetermined depth. The groove 30 has a depth greater than the outer diameter c of the conductive wire 11. The conductive wire 11 fits into the groove 30. In other words, an end surface 16*a* of the conductive wire 11 facing the first surface 21*a* is positioned recessed from the first surface 21*a*.

More specifically, the groove 30 includes a pair of side surfaces 30*a*, 30*a* facing each other, and a bottom surface 30*b* that has a semicircular cross section and connects the pair of side surfaces 30*a*, 30*a*. The pair of side surfaces 30*a*, 30*a* are parallel planes. The side surfaces 30*a*, 30*a* are, for example, substantially perpendicular to the first surface 21*a*. The side surfaces 30*a*, 30*a* have first ends connected to the first surface 21*a*. The side surfaces 30*a*, 30*a* have second ends connected to the bottom surface 30*b*. The side surfaces 30*a*, 30*a* are separated from each other in a predetermined direction X perpendicular to the axis L of the conductive wire 11 out of directions parallel to the first surface 21*a*. The "predetermined direction X" may be defined as a direction perpendicular to a direction of extension of the groove 30 out of the directions parallel to the first surface 21*a*.

An opening 37 disposed in a position where the side surfaces 30*a*, 30*a* connect to the first surface 21*a* has a width a equal to the distance between the side surfaces 30*a*, 30*a*. In this embodiment, the width a of the groove 30 is constant in a thickness direction of the main body 20 from the opening 37 to the second ends of the side surfaces 30*a*, 30*a*. The width a of the groove 30 is slightly greater than the outer diameter c of the conductive wire 11. The width a of the groove 30 is longer than a length of the outer diameter c of the conductive wire 11 plus, for example, the maximum tolerance of the outer diameter c.

The coil device 1 includes a holding structure 100 that holds the conductive wire 11. The holding structure 100 of the conductive wire 11 will be described with reference to FIGS. 2 to 4. As shown in FIG. 2, the coil body 12 of the conductive wire 11 includes linear portions 16 that are accommodated in the linear grooves 34*a* and curved portions 17 that are accommodated in the curved grooves 34*b*. The linear portions 16 and the curved portions 17 continue alternately along the winding direction to from a plurality of turns. The coil body 12 has a generally spiral shape.

Figure 2:
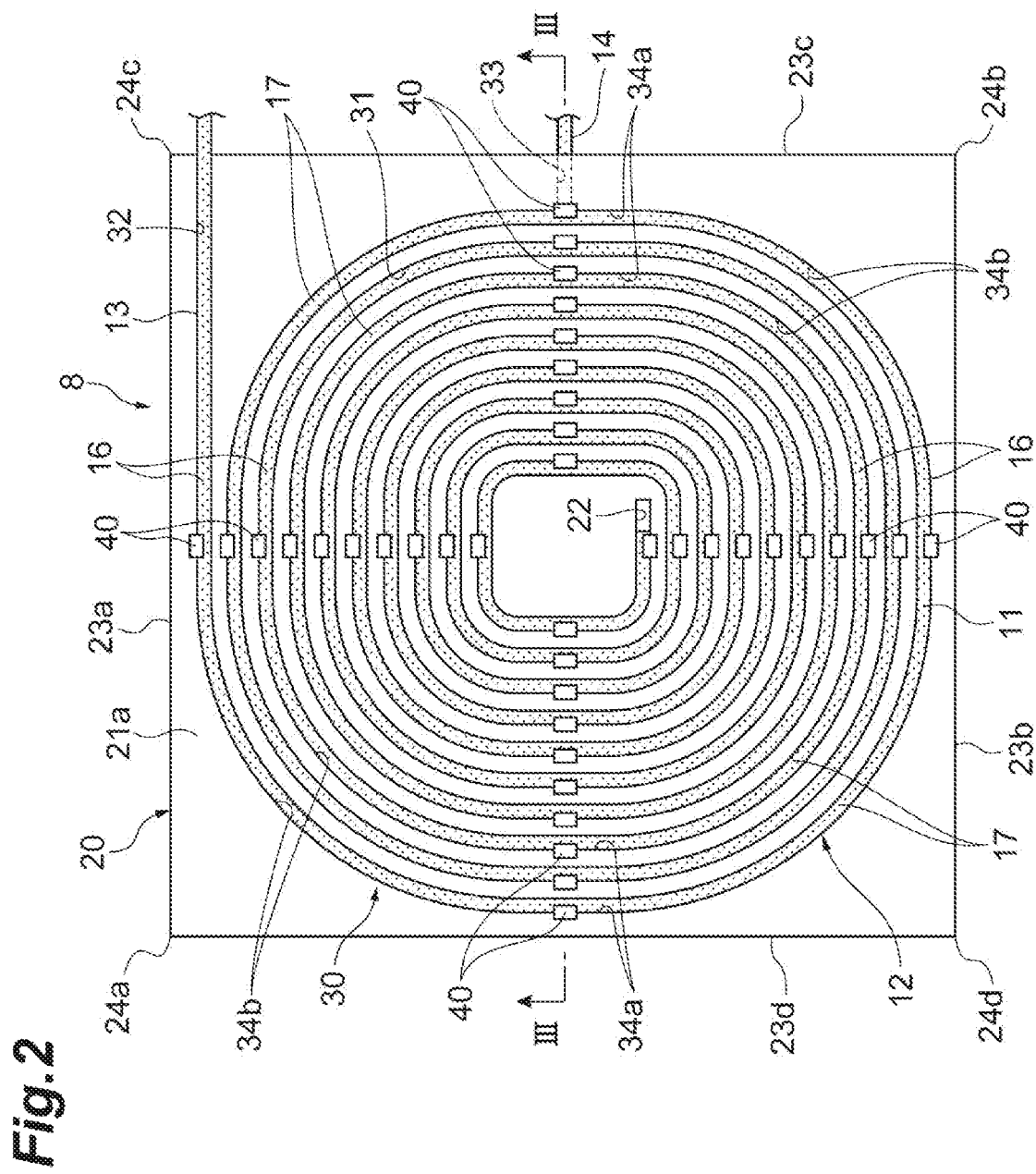
FIG. 2 is a plan view illustrating a holding member and a coil shown in FIG. 1.
Figure 3:
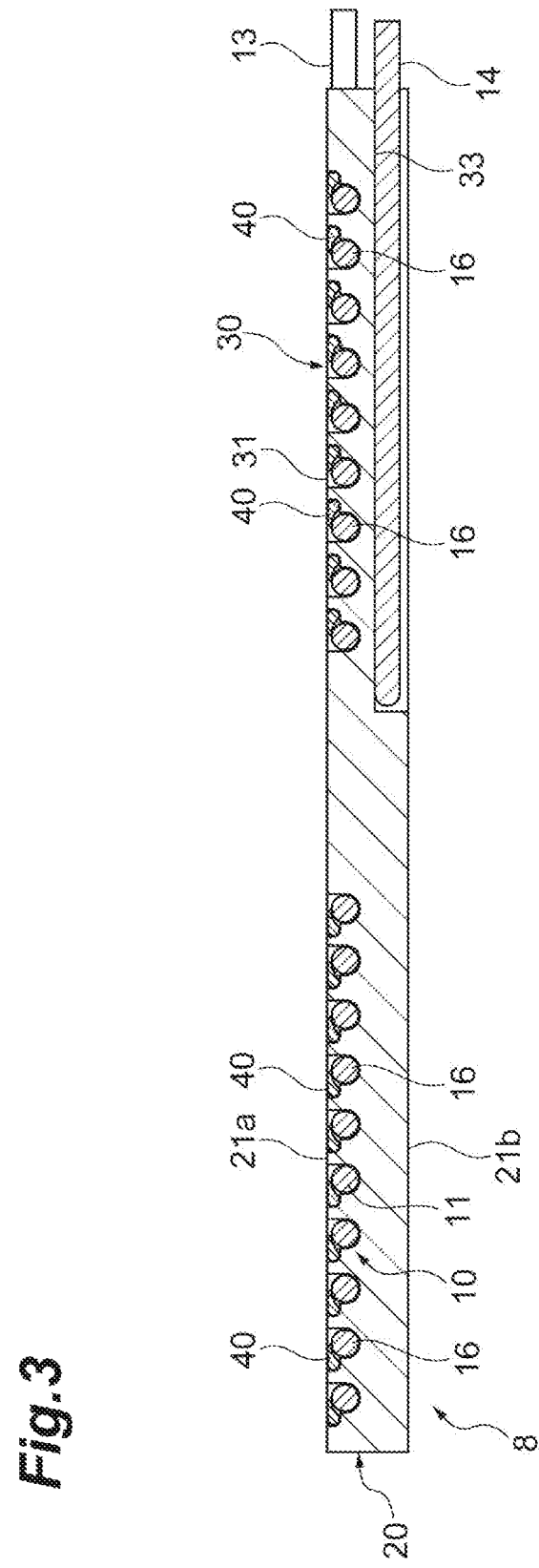
FIG. 3 is a cross-sectional view taken along line III-III in FIG. 2.

As shown in FIGS. 2 and 3, the linear portions 16 of the conductive wire 11 have a plurality of stoppers 40 that prevents removal of the conductive wire 11 from the groove 30 (groove body 31). The holding structure 100 includes each of these stoppers 40. The stoppers 40 are separate from the coil base 8. The stoppers 40 are attached to the main body 20 of the coil base 8. The stoppers 40 can have predetermined widths in a direction of extension of the conductive wire 11 (i.e., a direction of the axis L). The stoppers 40 can have predetermined lengths in the predetermined direction X. It should be noted that the stoppers 40 are omitted in FIG. 1.

For example, four stoppers 40 are formed in each turn. The stoppers 40 are, for example, formed circumferentially equally spaced. The plurality of stoppers 40 formed in the plurality of turns may be aligned in a radial direction of the coil body 12 (the predetermined direction X shown in FIG. 4). It should be noted the number and positions of the stoppers 40 are not limited to the embodiment described above and may be suitably modified. The number of the stoppers 40 may be different in each turn. There may be a turn without any stoppers 40. The stoppers 40 may be formed on the curved portions 17. The stoppers 40 may be formed on both the linear portions 16 and the curved portions 17.

The structure of each stopper 40 will now be described. The stopper 40 projects from the main body 20 toward the groove 30. In other words, a portion of the stopper 40 is positioned in the main body 20 outside the groove 30 and the remaining portion of the stopper 40 is positioned inside the groove 30. The stopper 40 is an arm-like single piece component that extends in the predetermined direction X.

As shown in FIG. 4, the stopper 40 includes a base portion 41 that is attached to the main body 20 and a distal end portion 42 that is integrated with the base portion 41 and covers the conductive wire 11. The stopper 40 can, for example, be integrally molded. The base portion 41 has, for example, a columnar shape. The distal end portion 42 is the arm-like portion that extends from a peripheral surface of the base portion 41 in the predetermined direction X. The distal end portion 42 is disposed in the opening 37 of the groove 30. The distal end portion 42 has a thickness that is smaller than the diameter of the base portion 41. The stopper 40 has a tapered shape. The distal end portion 42 covers approximately a radial half of the conductive wire 11 (linear portion 16). A gap that is smaller than the outer diameter c of the conductive wire 11 is formed between the distal end portion 42 and an edge of the opening 37. The distal end portion 42 faces the conductive wire 11 in a depth direction of the groove 30, that is, the thickness direction of the main body 20. The distal end portion 42 may abut the end surface 16a of the conductive wire 11 facing the first surface 21a. A small gap may be formed between the distal end portion 42 and the conductive wire 11.

The expression "the stopper 40 (distal end portion 42) covers the conductive wire 11" refers to a case in which the stopper 40 covers the entire outer diameter c of the conductive wire 11 and a case in which the stopper 40 covers a radial portion of the conductive wire 11. In other words, when the conductive wire 11 and the stopper 40 are projected on a plane parallel to the first surface 21a, it is only necessary that the area of the distal end portion 42 of the stopper 40 overlaps the area of the conductive wire 11. The distal end portion 42 may cover the entire outer diameter c of the conductive wire 11 or may cover an area smaller the radius of the conductive wire 11.

An accommodating portion 50, which is a space for accommodating the base portion 41, is formed in the main body 20 of the coil base 8. The accommodating portion 50 is positioned alongside the linear groove 34a and is continuous with the linear groove 34a. The accommodating portion 50 can have a predetermined width in the direction of extension of the conductive wire 11 (i.e., the direction of the axis L). The accommodating portion 50 has a width greater than the width of the base portion 41. The accommodating portion 50 includes a side surface 51 substantially parallel to the side surface 30a, a bottom surface 52 substantially parallel to the first surface 21a, and a curved surface 53 that connects the side surface 51 with the bottom surface 52. The side surface 51 and the bottom surface 52 are flat and substantially perpendicular to each other. The curved surface 53 between the side surface 51 and the bottom surface 52 is shaped as a portion of a cylindrical surface (e.g., the shape of a cylindrical surface divided circumferentially into four). The accommodating portion 50 further includes two side surfaces (not shown) which are formed on opposite ends in the direction of the axis L. These two side surfaces are substantially perpendicular to the first surface 21a and are connected to the respective ends of the side surface 51, the bottom surface 52, and the curved surface 53.

The base portion 41 of the stopper 40 is accommodated in the accommodating portion 50. In the holding structure 100 of the present embodiment, the base portion 41 may abut any one of wall surfaces of the accommodating portion 50 (e.g., the curved surface 53) and be attached to that wall surface. The base portion 41 may be fixed to another part of the coil base 8. For example, the base portion 41 may be fixed to the two side surfaces formed on the opposite ends in the direction of the axis L. The base portion 41 is fixed to the wall surface, for example, by adhesion. The base portion 41 may be attached to the wall surface by engagement between a projection and a recess.

The stopper 40 is entirely accommodated in the accommodating portion 50 and the groove 30. A flat top surface 40a of the stopper 40 does not protrude from the first surface 21a of the coil base 8. The top surface 40a may be parallel to the first surface 21a. The top surface 40a may be flush with the first surface 21a. The top surface 40a may be positioned slightly recessed from the first surface 21a.

In the holding structure 100 of the present embodiment, the stopper 40 is formed from an elastic material. More specifically, the stopper 40 may be formed from a soft resin material. The stopper 40 is formed from a material that is different from that of the coil base 8. In other words, the stopper 40 is formed from a deformable material. Thus, the distal end portion 42 is deformable. The distal end portion 42 can be moved out of the groove 30 by deforming. That is, the distal end portion 42 can be moved to a position protruding from the first surface 21a.

A mounting procedure of the conductive wire 11 (coil 10) using the holding structure 100 will be described. A plurality of the stoppers 40 are attached to the coil base 8 in advance. The stoppers 40 are different from the coil base 8 and have flexibility. Each distal end portion 42 is pulled up. When the distal end portion 42 is pulled up, a space larger than the outer diameter c of the conductive wire 11 is formed in the opening 37 of the groove 30. The conductive wire 11 is fitted into the groove 30 through this space. The distal end portion 42 is returned its original position. The conductive wire 11 can be held down by the tapered stopper 40.

Since a space larger than the outer diameter c is formed when the conductive wire 11 is passed through between the coil base 8 and the stopper 40, the conductive wire 11 need not be deformed greatly. For example, in a traditional coil device disclosed in Patent Literature 3 (Japanese Unexamined Patent Publication No. 2012-114058), a nail is formed in a recess of a coil base. When attaching a coil to the coil base, it is necessary to deform the cross section of the conductive wire to pass the conductive wire. If the twists are loosened due to the cross-sectional deformation of the conductive wire, skin effect may decrease the ability of the conductive wire to reduce effective resistance. Moreover, the bundle of thin wires that make up the conductive wire may not have an outer skin. When attaching the conductive wire to the coil base, pushing the conductive wire into the recess while placing the conductive wire into contact with the nail may damage the wires. According to the holding structure 100 of the present embodiment, the conductive wire 11 can be attached without applying excessive external force to the conductive wire 11. The concerns of the related art mentioned above are thus overcome.

As described above, in the coil device 1, the coil base 8 has the stopper 40 attached thereto. The distal end portion 42 of the stopper 40 covers the conductive wire 11. The stopper 40 prevents the conductive wire 11 accommodated in the groove 30 from being removed from the groove 30. Thus, the conductive wire 11 can be securely accommodated in a desired position in the groove 30. Additionally, deforming the distal end portion 42 of the stopper 40 enables the distal end portion 42 to be separated from where the conductive wire 11 is accommodated in the groove 30. Thus, the conductive wire 11 can be placed into the groove 30. Returning the deformed distal end portion 42 to its original position causes the distal end portion 42 to cover the conductive wire 11. Consequently, the conductive wire 11 can be easily attached to the coil base 8.

Having the base portion 41 accommodated in the accommodating portion 50 allows a portion of the stopper 40 to be contained inside the coil base 8. This enables the coil base 8 with the stopper 40 to be compact. This also facilitates covering of the conductive wire 11 by the distal end portion 42, since the base portion 41 is close to the groove 30.

Since the stopper 40 does not protrude from the first surface 21a of the coil base 8, the conductive wire 11 is less likely to interfere with other components. The coil base 8 holding the conductive wire 11 can be easily assembled to the other components (e.g., the base plate 6 and the cover 7). This enables the coil base 8 with the stopper 40 to be compact in the thickness direction. This achieves a generally compact coil device 1.

The deformable stopper 40 facilitates placing of the conductive wire 11 into the groove 30. The stopper 40 formed from an elastic material also enables the distal end portion 42 to hold down the conductive wire 11.

Additionally, the strength (pressing force) for holding down the conductive wire 11 may be adjusted by adjusting the elasticity of the stopper 40. The inductance (the so-called L value) of the coil 10 can also be finely adjusted, accordingly.

Figure 5:
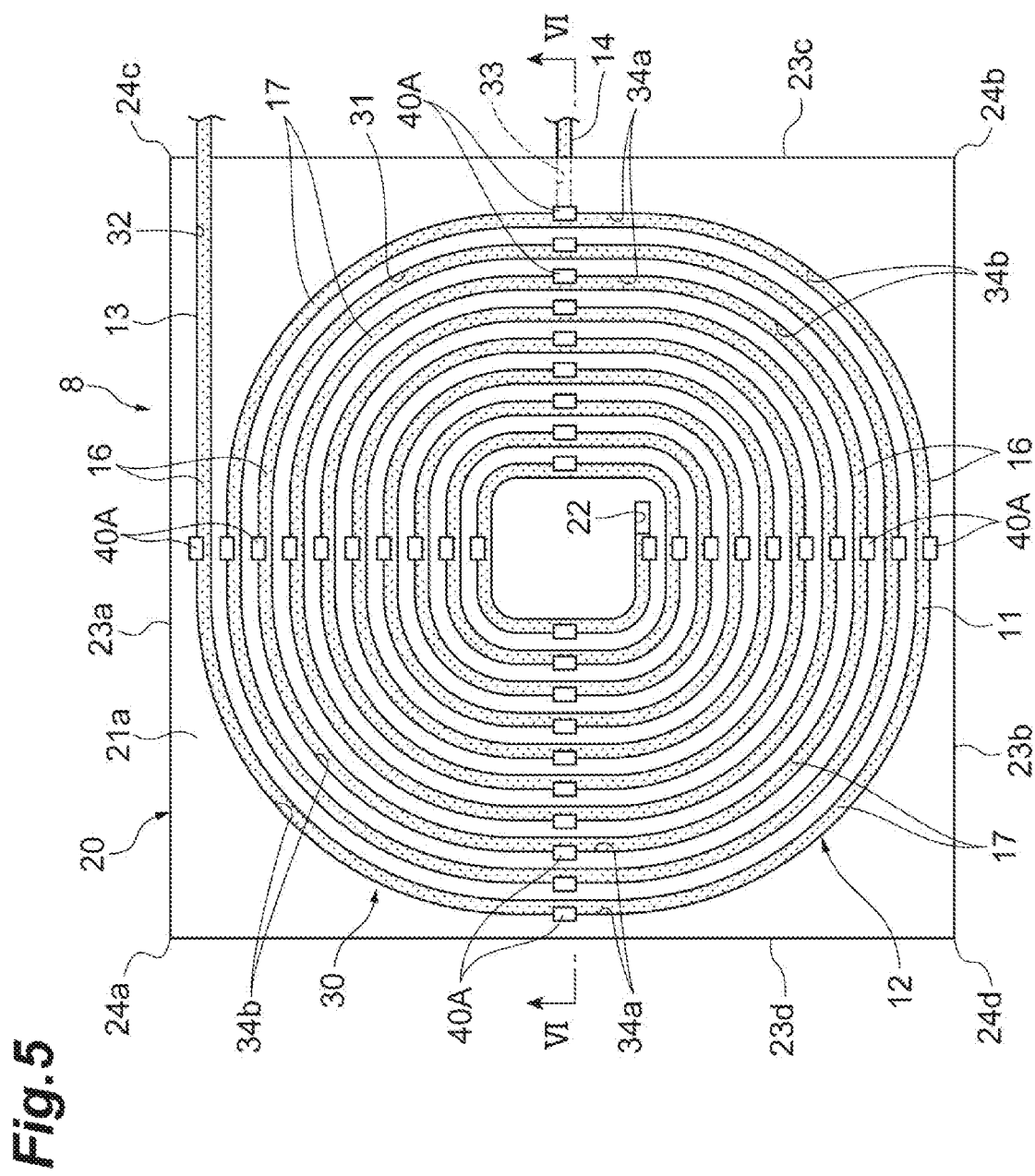
FIG. 5 is a plan view illustrating a holding member and a coil according to a second embodiment of the present disclosure.
Figure 6:
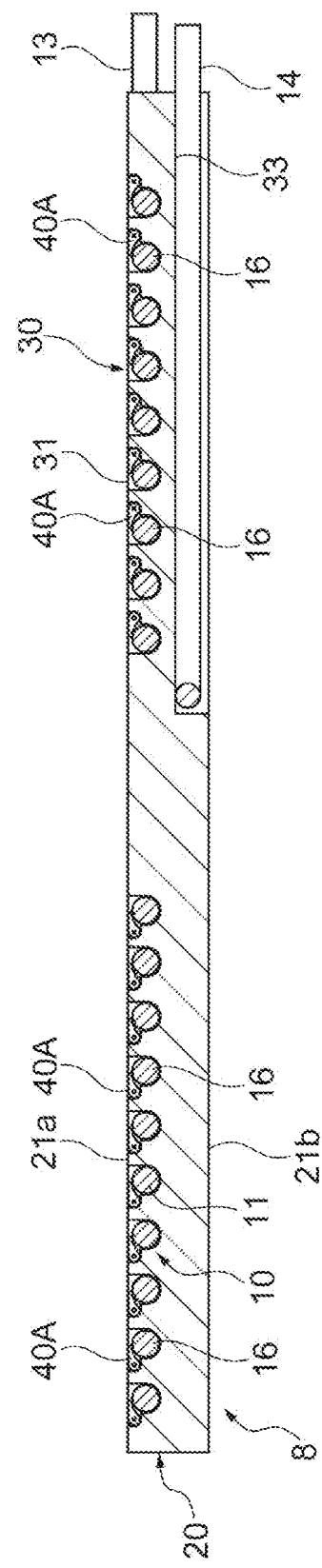
FIG. 6 is a cross-sectional view taken along line VI-VI in FIG. 5.

A coil device 1 according to a second embodiment will next be described with reference to FIGS. 5 to 7. The second embodiment is different from the first embodiment in that it has a rotatable stopper 40A instead of the stopper 40. As shown in FIGS. 5 and 6, a plurality of the stoppers 40A are formed in positions similar to those in the embodiment 1. With regard to the number and positions of the stoppers 40A, the same ideas as those of the first embodiment can be applied to the various embodiments described below, and thus description thereof is omitted.

Figure 7:
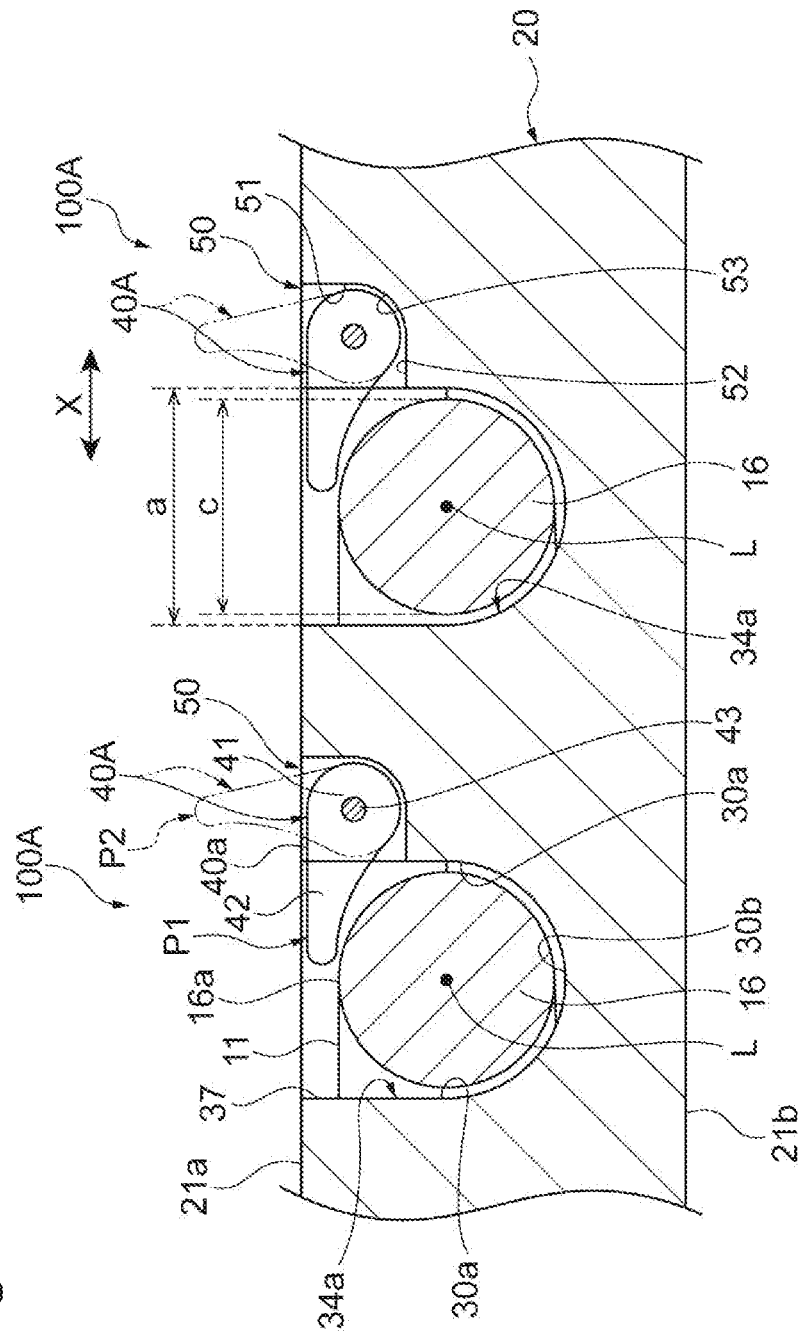
FIG. 7 is a partly enlarged view of FIG. 6 and a cross-sectional view illustrating holding structures of the coil.

As shown in FIG. 7, each stopper 40A of a holding structure 100A has a size and shape similar to those of the stopper 40. The base portion 41 of the stopper 40A includes a shaft 43 and is rotatable relative to the coil base 8. The shaft 43 is rotatably attached to the two side surfaces (not shown) of the accommodating portion 50 formed on the opposite ends in the direction of the axis L. The shaft 43 is, for example, parallel to the axis L. It should be noted that the stopper 40A may be rotatable relative to the shaft 43 that is fixed to the coil base 8. It should be noted that FIGS. 6 and 7 show a cross section of the shaft 43 and side surfaces of the base portion 41 and the distal end portion 42.

The stopper 40A is different from the stopper 40 and may be formed, for example, from a hard resin material similar to that of the coil base 8. It should be noted that the stopper 40A may be formed from a material similar to that of the stopper 40.

The stopper 40A is attached to the coil base 8 so as not to easily move. The stopper 40A is attached to the coil base 8 so as not to rotate unless a significant external force is applied. For example, frictional resistance between the coil base 8 and the shaft 43 may be increased. In the case in which the stopper 40A is rotatable relative to the shaft 43, the frictional resistance between the shaft 43 and the stopper 40A may be increased.

The distal end portion 42 of the stopper 40A is movable to a first position P1 (shown in solid lines in FIG. 7) for covering the conductive wire 11 and a second position P2 (shown in phantom lines in FIG. 7) away from the opening 37 of the groove 30. The first position P1 of the stopper 40A is, for example, the same as the position of the stopper 40 of the first embodiment holding down the conductive wire 11.

A mounting procedure of the conductive wire 11 (coil 10) using the holding structure 100A will be described. The plurality of the stoppers 40A are attached to the coil base 8 in advance. Each distal end portion 42 is pulled up and the base portion 41 (stopper 40) rotates. The rotation of the base portion 41 causes the distal end portion 42 to move to the second position P2. A space larger than the outer diameter c of the conductive wire 11 is formed in the opening 37 of the groove 30. The conductive wire 11 is fitted into the groove 30 through this space. The distal end portion 42 is pushed down and the base portion 41 rotates in an opposite direction. The distal end portion 42 is returned to the first position P1. The conductive wire 11 can be held down by the tapered stopper 40.

The coil device 1 of the second embodiment achieves the same operation and effect as those of the first embodiment. Rotating the base portion 41 of the stopper 40A allows the distal end portion 42 to be separated from where the conductive wire 11 is accommodated in the groove 30. Thus, the conductive wire 11 can be placed into the groove 30. Additionally, returning the stopper 40A to its original position by rotating the base portion 41 causes the distal end portion 42 to cover the conductive wire 11. Consequently, the conductive wire 11 can be easily attached to the coil base 8.

When the stopper 40A is in the first position P1, the stopper 40A prevents the conductive wire 11 from being removed from the groove 30. When the stopper 40A is in the second position P2, the conductive wire 11 can be easily placed into the groove 30.

The strength (pressing force) for holding down the conductive wire 11 may be adjusted by adjusting the mounting state of the stopper 40A via the shaft 43. The inductance (the so-called L value) of the coil 10 can also be finely adjusted, accordingly.

Figure 8:
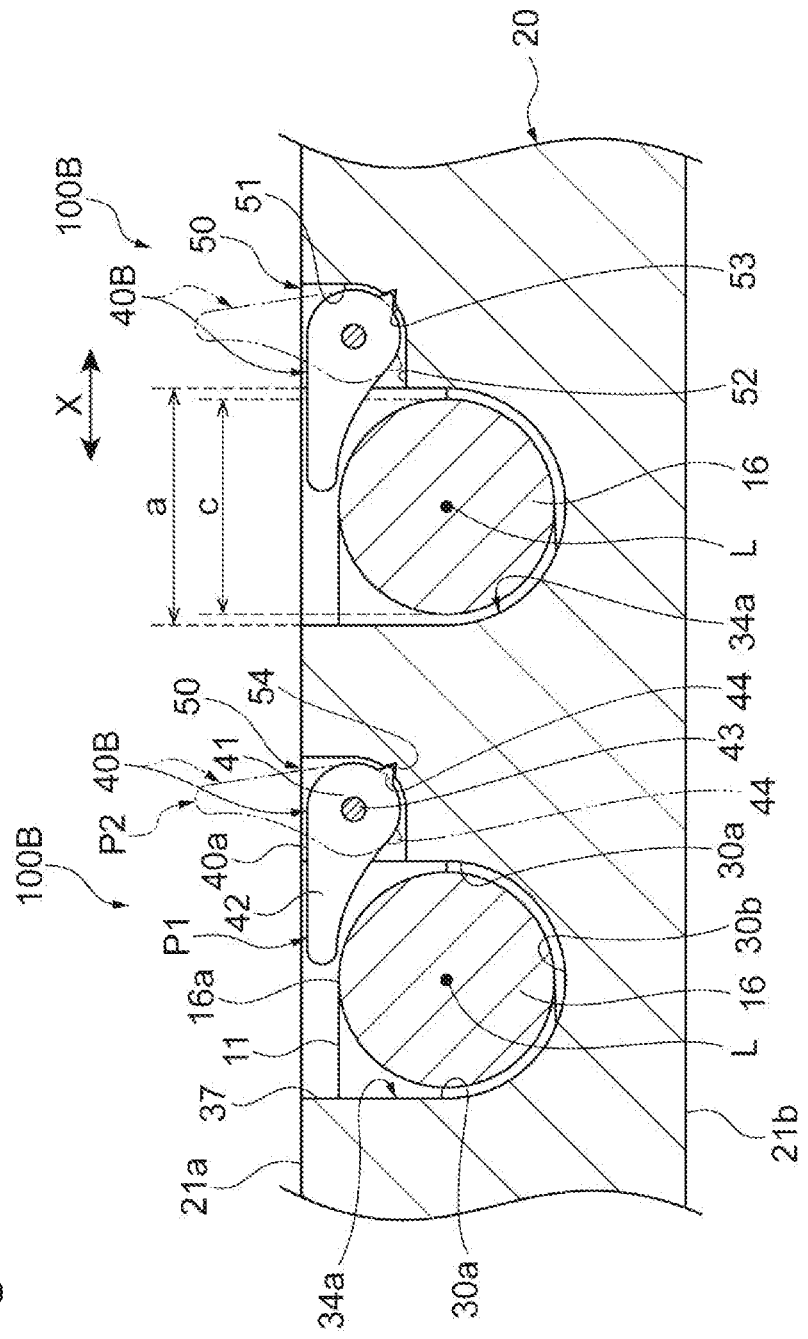
FIG. 8 is a cross-sectional view illustrating a variation of the holding structures of the coil.

As shown in FIG. 8, a holding structure 100B can be adopted as one embodiment. A stopper 40B includes the shaft 43 and is rotatable, similarly to the stopper 40A. The stopper 40B is different from the stopper 40A in that it includes a projection 44 that is formed on the peripheral surface of the base portion 41. A recess 54 is formed in the curved surface 53 of the accommodating portion 50. The projection 44 is engageable in the recess 54 by fitting into the recess 54.

The stopper 40B is positioned in the first position P1 with the projection 44 engaged in the recess 54. The stopper 40B is configured so as not to rotate easily by the engagement of the projection 44 in the recess 54. The sizes and shapes of the projection 44 and the recess 54 can be set as appropriate. The coil device 1 with the stopper 40B also achieves the same operation and effect as those of the first and second embodiments described above.

The engagement of the projection 44 in the recess 54 restricts the rotation of the stopper 40B. This can prevent the stopper 40B from moving inadvertently and facilitates maintaining the position of the stopper 40B.

It should be noted that a projection may be formed in the coil base so as to be engageable in a recess formed in the base portion 41 of the stopper 40B.

Figure 9:
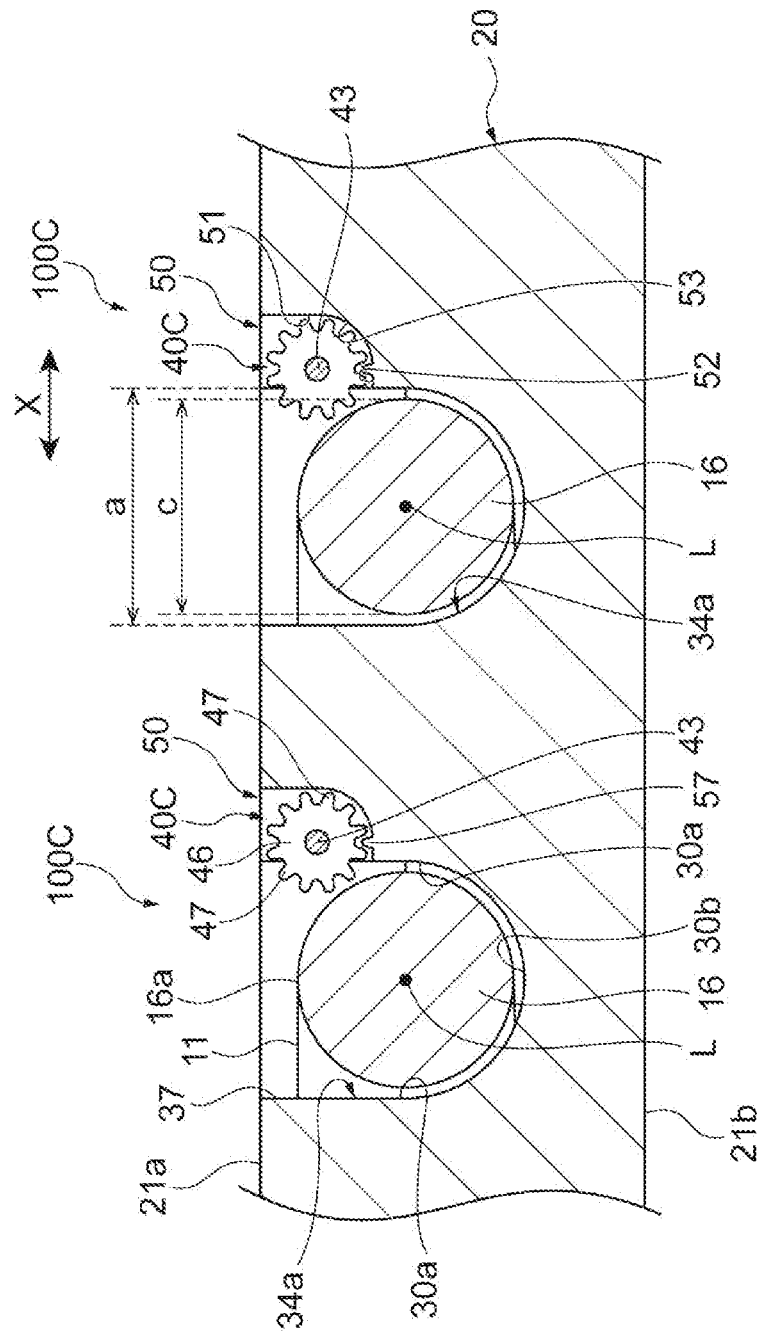
FIG. 9 is a cross-sectional view illustrating holding structures of a coil according a third embodiment of the present disclosure.

A coil device 1 according to a third embodiment will be described with reference to FIG. 9. In a holding structure 100C, a stopper 40C includes a cylindrical base portion 46 rotatable about the shaft 43 and a plurality of teeth 47 equally spaced about a circumference of the base portion 46. One of the plurality of teeth 47 covers the conductive wire 11 as a distal end portion. The stopper 40C is a gear-like stopper.

A projection 57 is formed on the bottom surface 52 of the accommodating portion 50. The teeth 47 engage with the projection 57 such that the teeth 47 move over the projection 57 only when a certain amount of external force is applied. The projection 57 functions as a locking part that locks rotation of the stopper 40C. This prevents the stopper 40C from rotating inadvertently.

The coil device 1 of the third embodiment also achieves the same operation and effect as those of the first and second embodiments. Rotating the base portion 46 of the stopper 40C can slightly separate one of the teeth 47 from where the conductive wire 11 is accommodated in the groove 30. Thus, the conductive wire 11 can be placed into the groove 30. Rotation of the stopper 40C enables the conductive wire 11 to be placed into the groove 30. The conductive wire 11 can be easily attached to the coil base 8.

When placing the conductive wire 11 into the groove 30, the conductive wire 11 may abut against the teeth 47 of the stopper 40C, but the rotation of the base portion 46 can reduce the load on the conductive wire 11. The conductive wire 11 can be easily placed into the groove 30. After the conductive wire 11 is accommodated, one of the teeth 47 covers the conductive wire 11 so that the conductive wire 11 does not tend to be removed from the groove 30.

Although the embodiments of the present disclosure have been described above, the present invention is not limited to the above-described embodiments.

For example, the coil 10 (conductive wire 11) is not limited to being held by the coil base 8. The coil 10 may be held by the cover 7 (see, FIG. 1). Similarly to the embodiments described above, a stopper (holding structure) may be formed on an inner surface of the cover 7. The groove 30 will be formed within the thickness of a tabular portion (a portion facing the ferrite 9 and the base plate 6) of the cover 7. An insulating plate can be disposed between the cover 7 and the ferrite 9. In a coil device with such a configuration, the cover 7 is also the coil base, so that the need for a bobbin as a holding member is eliminated. The omission of the bobbin enables the coil device to be thin. The coil device in which the cover 7 holds the coil 10 also achieves the same operation and effect as those of the coil devices described above.

It is not necessary for an axis of rotation of the stopper to extend along the groove 30, that is, along the axis L of the conductive wire 11. The axis of rotation of the stopper may extend in a direction intersecting the axis L of the conductive wire 11. The stopper is not limited to rotate about a predetermined axis (or shaft). The base portion of the stopper may be pivotally attached to the coil base (accommodating portion).

It is not necessary for the stopper 40 to be entirely accommodated in the accommodating portion 50 and the groove 30. A portion (i.e., the top surface 40a) of the stopper 40 may protrude from the first surface 21a.

The accommodating portion 50 may be omitted from the coil base 8. The stopper may be attached to the first surface 21a of the coil base 8.

One coil device 1 may have only one stopper 40. The one stopper 40 may cover the conductive wire 11 at a plurality of locations. That is, the one stopper 40 may have a plurality of the distal end portions 42.

The stopper is not limited to the gear-like stopper 40C of the third embodiment and may be a cylindrical stopper without the teeth 47. That is, the stopper may have a smooth circumferential surface. The stopper may have any shape as long as it is attached so as not to rotate unless a certain amount of external force is applied.

Although the above embodiments describe cases in which the coil device of the present disclosure is applied to a wireless power transfer system, the application of the present disclosure is not limited to the wireless power transfer system. For example, the coil device of the present disclosure may be applied to an induction heating system or an eddy current inspection system.

INDUSTRIAL APPLICABILITY

According to some embodiments of the present disclosure, a conductive wire can be securely accommodated in a desired position in a groove and can be easily attached.

REFERENCE SIGNS LIST

1 Coil device
8 Coil base
10 Coil
11 Conductive wire
30 Groove
40 Stopper
40A, 40B, 40C Stopper
41 Base portion
42 Distal end portion
43 Shaft
44 Projection
46 Base portion
47 Teeth
50 Accommodating portion
54 Recess
57 Projection
P1 First position
P2 Second position
X Predetermined direction

The invention claimed is:

1. A coil device comprising:
a conductive wire forming a coil;
a coil base having a groove for accommodating the conductive wire; and
a stopper being separate from the coil base and attached to the coil base to cover the conductive wire,
wherein the stopper includes a base portion attached to the coil base at a position adjacent the groove, and a distal end portion integrated with the base portion to cover the conductive wire,
wherein the base portion of the stopper is rotatable, or the distal end portion of the stopper is deformable, and
wherein the coil base has an accommodating portion continuous with the groove and the base portion is accommodated in the accommodating portion.

2. The coil device according to claim 1, wherein the stopper is entirely accommodated in the accommodating portion and the groove and does not protrude from a surface of the coil base.

3. The coil device according to claim 2, wherein the base portion of the stopper is rotatable about an axis, and the distal end portion of the stopper is movable to a first position for covering the conductive wire and a second position away from the groove.

4. The coil device according to claim 3, wherein the base portion of the stopper includes a projection engageable in a recess formed in a wall surface of the coil base.

5. The coil device according to claim 3, wherein the coil base includes a projection engageable in a recess formed in the base portion of the stopper.

6. The coil device according to claim 3, wherein the stopper includes the base portion having a cylindrical shape and rotatable about the axis and a plurality of teeth formed on a circumference of the base portion, and one of the teeth covers the conductive wire as the distal end portion.

7. The coil device according to claim 2, wherein the stopper is formed from an elastic material and the distal end portion of the stopper is deformable.

8. The coil device according to claim 1, wherein the base portion of the stopper is rotatable about an axis, and the distal end portion of the stopper is movable to a first position for covering the conductive wire and a second position away from the groove.

9. The coil device according to claim 8, wherein the base portion of the stopper includes a projection engageable in a recess formed in a wall surface of the coil base.

10. The coil device according to claim 8, wherein the coil base includes a projection engageable in a recess formed in the base portion of the stopper.

11. The coil device according to claim 8, wherein the stopper includes the base portion having a cylindrical shape and rotatable about the axis and a plurality of teeth formed on a circumference of the base portion, and one of the teeth covers the conductive wire as the distal end portion.

12. The coil device according to claim 1, wherein the stopper is formed from an elastic material and the distal end portion of the stopper is deformable.

13. The coil device according to claim 1, wherein the base portion of the stopper is rotatable about an axis, and the distal end portion of the stopper is movable to a first position for covering the conductive wire and a second position away from the groove.

14. The coil device according to claim 13, wherein the base portion of the stopper includes a projection engageable in a recess formed in a wall surface of the coil base.

15. The coil device according to claim 13, wherein the coil base includes a projection engageable in a recess formed in the base portion of the stopper.

16. The coil device according to claim 13, wherein the stopper includes the base portion having a cylindrical shape and rotatable about the axis and a plurality of teeth formed on a circumference of the base portion, and one of the teeth covers the conductive wire as the distal end portion.

17. The coil device according to claim 1, wherein the stopper is formed from an elastic material and the distal end portion of the stopper is deformable.

* * * * *